(12) United States Patent
Burt

(10) Patent No.: US 10,604,280 B2
(45) Date of Patent: Mar. 31, 2020

(54) CAPSULATION SATELLITE SYSTEM

(71) Applicant: U.S.A. as represented by the Administrator of the National Aeronautics and Space Administration, Washington, DC (US)

(72) Inventor: Irving Joseph Burt, Dayton, MD (US)

(73) Assignee: U.S.A. as represented by the Administrator of the National Aeronautics and Space Administration, Washington, DC (US)

( * ) Notice: Subject to any disclaimer, the term of this patent is extended or adjusted under 35 U.S.C. 154(b) by 460 days.

(21) Appl. No.: 15/449,086

(22) Filed: Mar. 3, 2017

(65) Prior Publication Data
US 2018/0251241 A1  Sep. 6, 2018

(51) Int. Cl.
*B65D 81/18* (2006.01)
*B64G 1/50* (2006.01)
*B64G 1/48* (2006.01)
*B64G 1/10* (2006.01)
*B64G 1/58* (2006.01)

(52) U.S. Cl.
CPC .......... *B64G 1/50* (2013.01); *B64G 1/10* (2013.01); *B64G 1/48* (2013.01); *B64G 1/58* (2013.01)

(58) Field of Classification Search
None
See application file for complete search history.

(56) References Cited

U.S. PATENT DOCUMENTS

| | | | | |
|---|---|---|---|---|
| 3,563,258 A | * | 2/1971 | Hechler, IV | B65D 49/04 137/1 |
| 3,895,959 A | * | 7/1975 | Dehmelt | H01M 10/34 429/152 |
| 2003/0010041 A1 | * | 1/2003 | Wessling | B64G 1/50 62/60 |
| 2006/0151354 A1 | * | 7/2006 | Dombroski | B65D 81/2053 206/524.8 |

* cited by examiner

*Primary Examiner* — Reginald S Tillman, Jr.
(74) *Attorney, Agent, or Firm* — Christopher Edwards; Bryan A. Geurts

(57) ABSTRACT

A capsulation satellite module for transferring a payload by an earth-launch vehicle to an outer space. The capsulation satellite module comprises a casing defining a hermetically sealed inner cavity therewithin. The casing includes a continuous sidewall and first and second cover assemblies mounted to axially opposite sides of the sidewall so as to delimit the hermetically sealed inner cavity within the casing. The first cover assembly defines a first gas chamber therein extending over the inner cavity of the casing. The second cover assembly defines a second gas chamber therein extending over the inner cavity of the casing. Each of the first gas chamber and the second gas chamber are fluidly connected to the sealed inner cavity and to each other through the sealed inner cavity to maintain predetermined pressure and temperature within the cavity.

20 Claims, 11 Drawing Sheets

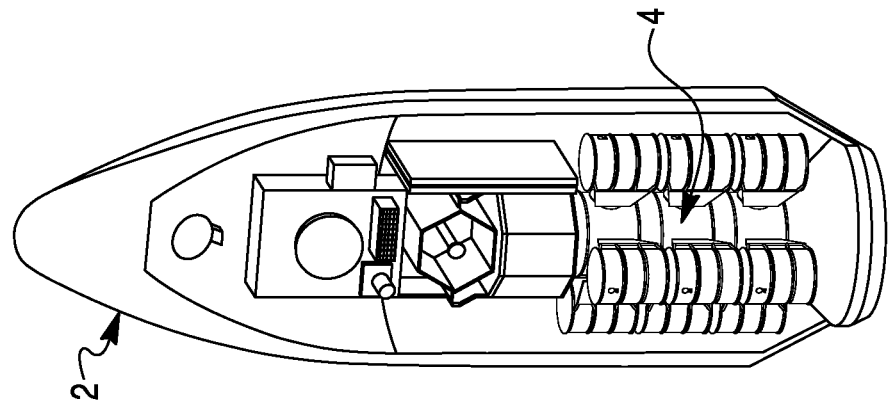
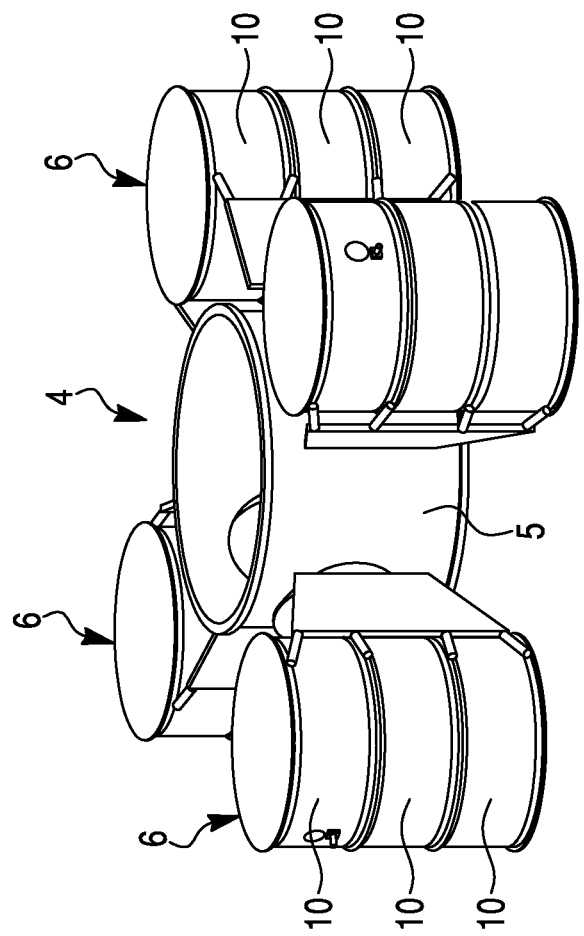

CAPSULATION SATELLITE SYSTEM

BACKGROUND OF THE INVENTION

1. Field of the Invention

The present invention generally relates to satellites and other space probes; and more particularly to a capsulation satellite module for transferring a payload to outer space and configured to maintain a substantially terrestrial atmospheric pressure and a substantially terrestrial room temperature within the capsulation satellite module in outer space.

2. Description of the Prior Art

Typically, space vehicles, such as satellites and other space probes, are used to transport a payload, including scientific instruments and other pieces of equipment to outer space.

When orbiting in an outer space station, satellites are exposed to extreme temperature variations as the space vehicle faces the Sun and is hidden from the Sun as it rotates about the Earth. When hidden from the Sun, temperatures of about −100° F. will be present, however temperatures of more than 160° F. will be present when the space vehicle faces the Sun. Thermal cycling is a major source of stress and a cause of on-orbit failure of scientific instruments and other pieces of equipment during outer space exploration. Moreover, depending upon the orientation, the space vehicle may have those temperature extremes simultaneously but on different surfaces.

In the conditions that exist in the space vehicles, there are space, weight and power limitations with respect to thermal control devices which may be used for heating and/or cooling the pieces of equipment on board the space vehicles. Therefore, any such thermal control device must be compact, lightweight and have low power requirements.

Current satellites for hosting scientific instrument(s) and/or other piece(s) of equipment for outer space exploration are quite complex, cumbersome and expensive. Therefore, while conventional satellite modules, including but not limited to those discussed above, have proven to be acceptable for outer space exploration, improvements that may enhance their performance and cost are possible.

Accordingly, a need in the art exists for a compact, lightweight, low-power thermal control system for a satellite module intended to host scientific instrument(s) and/or other piece(s) of equipment during outer space exploration, which can maintain a substantially terrestrial atmospheric pressure and a substantially terrestrial room temperature within the capsulation satellite module while in outer space.

BRIEF SUMMARY OF THE INVENTION

According to a first aspect of the invention, there is provided a capsulation satellite module for carrying a payload on an orbit in outer space. The capsulation satellite module comprises a casing defining a hermetically sealed inner cavity therewithin. The casing includes a continuous sidewall, and first and second cover assemblies mounted to axially opposite sides of the sidewall so as to delimit the hermetically sealed inner cavity within the casing. The first cover assembly defines a first gas chamber extending over the inner cavity of the casing. The second cover assembly defines a second gas chamber extending over the inner cavity of the casing. Each of the first gas chamber and the second gas chamber is fluidly connected to the sealed inner cavity and to each other through the sealed inner cavity to maintain predetermined pressure and temperature within the cavity.

According to a second aspect of the present invention, there is provided a method for operating of a capsulation satellite module comprising a casing defining a hermetically sealed inner cavity therewithin. The casing includes a continuous sidewall, and first and second cover assemblies mounted to axially opposite sides of the sidewall so as to delimit the hermetically sealed inner cavity within the casing and to maintain a predetermined pressure and temperature within the cavity. The first cover assembly defines a substantially planar first gas chamber extending over the inner cavity of the casing. The second cover assembly defines a substantially planar second gas chamber extending over the inner cavity of the casing. Each of the first gas chamber and the second gas chamber are fluidly connected to the sealed inner cavity and to each other through the sealed inner cavity. The method involves the steps of deploying the capsulation satellite module in an orbit in outer space, and orienting the capsulation satellite module so that an outer peripheral surface of one of the first and second cover assemblies faces the Sun, and an outer peripheral surface of another of the first and the second cover assemblies faces away from the Sun.

Other aspects of the invention, including apparatus, devices, systems, converters, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein:

FIG. 1 is a perspective view of a capsulation satellite system including a plurality of stacks of capsulation satellite modules in accordance with an exemplary embodiment of the present invention;

FIG. 2 is a perspective view of the capsulation satellite system of FIG. 1 disposed in a spacecraft;

Figure 3:
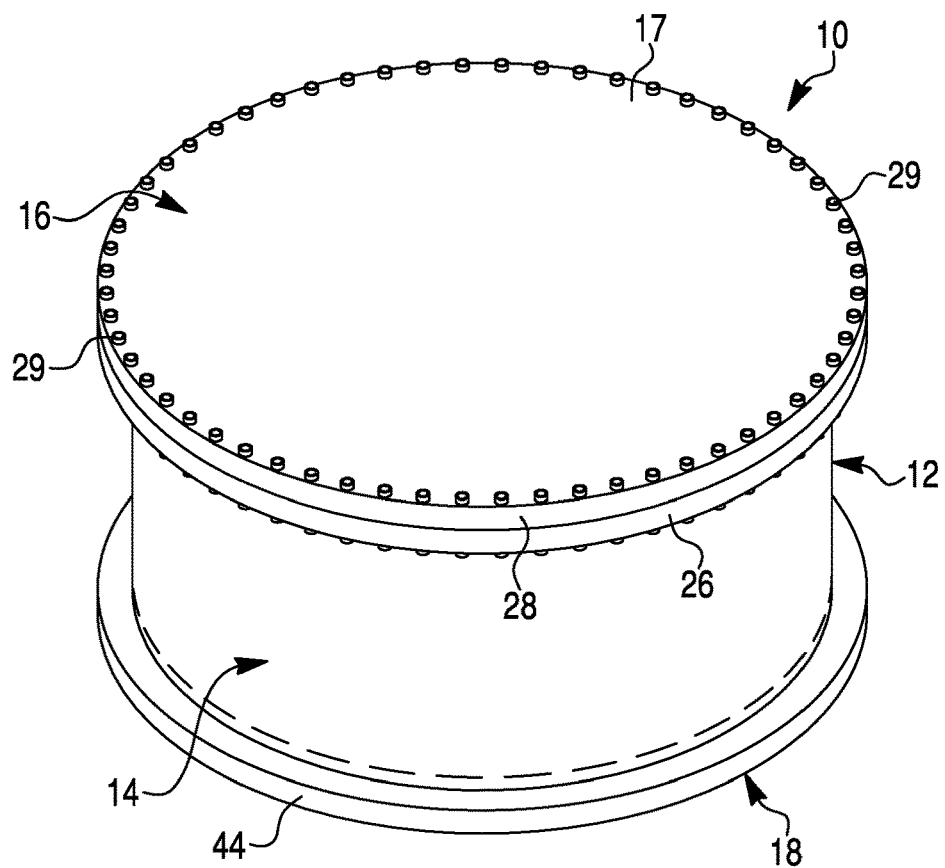
FIG. 3 is a perspective view of a casing of a capsulation satellite module in accordance with an exemplary embodiment of the present invention.
Figure 4:
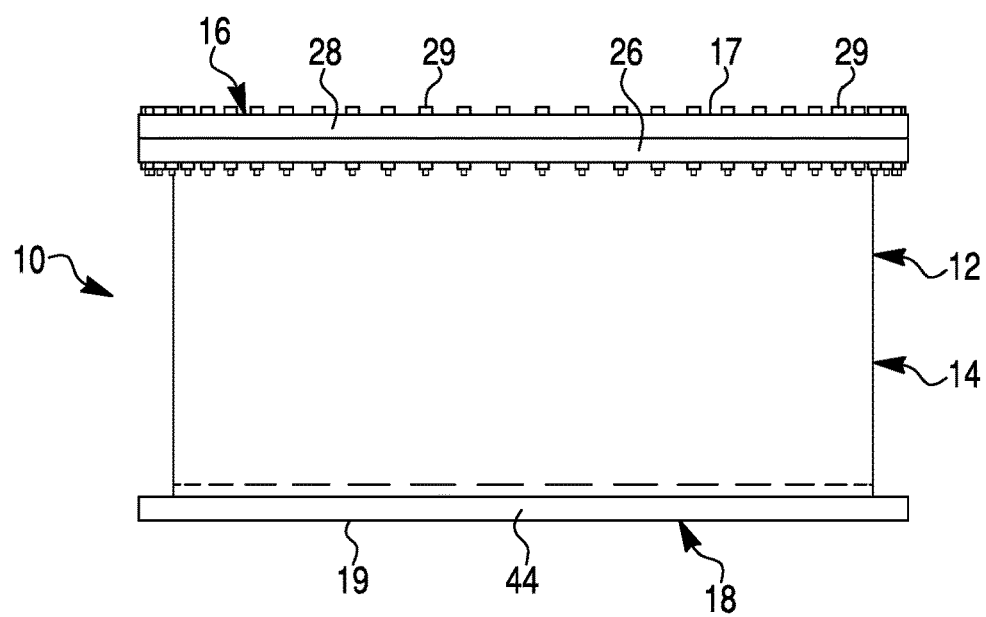
FIG. 4 is a side view of the casing of the capsulation satellite module in accordance with the exemplary embodiment of the present invention.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper", "lower", "right", "left", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the word "a" and "an" as used in the claims means "at least one" and the word "two" as used in the claims means "at least two".

An exemplary embodiment of a capsulation satellite system is generally represented in FIG. 1 by reference numeral 4. The capsulation satellite system 4 includes at least one, preferably two or more capsulation satellite modules according to an exemplary embodiment of the present invention, each generally represented in FIG. 1 by reference numeral 10. Two or more capsulation satellite modules 10 are stacked to each other to form a 2 or 3 module stack 6, as best shown in FIG. 1. As further shown in FIG. 1, the two or more capsulation satellite module stacks 6 can be attached to a standard ESPA (EELV Secondary Payload Adapter) ring (or ESPA Grande) 5. It is known in the art that the ESPA is an inter-stage adapter ring for launching secondary payloads on Evolved Expendable Launch Vehicle (EELV) or on EELV-class orbital launch vehicles, such as a spacecraft.

The capsulation satellite module (or capsule) 10 is intended to host scientific instrument(s) and/or other piece(s) of equipment, such as a high-resolution camera, telescope, magnetometer, spectrometer, etc. for outer space exploration. In the disclosed invention, the capsulation satellite system 4 is intended to be launched into an orbit by a spacecraft 2. The capsulation satellite system 4 including four module stacks 6, each including 3 satellite modules 10, which are mounted inside a spacecraft 2, is shown in FIG. 2. The term "outer space", or just "space" refers to the region beyond the earth's atmosphere or beyond the solar system, or the void that exists between celestial bodies, including the Earth.

The capsulation satellite module 10 is in the form of a pressurized and thermally controlled capsule that comprises a hermetically sealed casing 12 configured to maintain a substantially terrestrial atmospheric pressure and a substantially terrestrial room temperature within the casing 12 when in outer space.

Terrestrial atmospheric pressure is the pressure exerted by the weight of air in the atmosphere of Earth. In most circumstances atmospheric pressure is closely approximated by the hydrostatic pressure caused by the weight of air above the measurement point. Standard sea-level pressure, by definition, equals 760 mm (29.92 inches) of mercury, 14.70 pounds per square inch, $1,013.25 \times 10^3$ dynes per square centimeter, 1.01325 bar, one standard atmosphere, or 101.325 kilopascals (kPa). Variations about these values are typically quite small; for example, the highest and lowest sea-level pressures ever recorded were 32.01 inches (in the middle of Siberia) and 25.90 inches (in a typhoon in the South Pacific). The small variations in pressure that do exist largely determine the wind and storm patterns of Earth.

Terrestrial room temperature refers to the range of temperatures that people tend to prefer for indoor settings. It represents the small range of temperatures at which the air feels neither hot nor cold when wearing typical indoor clothing. The range is approximately between 15° C. (59° F.) and 30° C. (86° F.). In certain fields, like science and engineering, and within a particular context, "room temperature" may have an agreed upon value for temperature. For example, the American Heritage Dictionary of the English Language identifies room temperature as around 20 to 22° C. (68 to 72° F.).

The casing 12 of the capsulation satellite module 10 includes a continuous cylindrical sidewall 14 and opposite first (or top) and second (or bottom) cover assemblies 16 and 18, respectively, mounted to axially opposite sides of the sidewall 14 so as to define a hermetically sealed inner cavity 20 within the casing 12. Casing 12 is hermetically sealed from the environment outside the casing 12 and is filled with a gaseous fluid, such as air. In other words, the casing 12 is sealed, or encapsulated, in a hermetic manner in the inner cavity 20 in which the atmosphere is controlled (control of the temperature and the pressure in the inner cavity 20). Alternatively, the continuous sidewall 14 may have a prismatic form. According the exemplary embodiment of the present invention, the sidewall 14 is made of aluminum alloys, such as a tempered grade and precipitation hardened aluminum alloy 6061-T6 (containing magnesium and silicon as its major alloying elements, solutionized and artificially aged).

The first cover assembly 16 defines a first gas chamber 22 therein extending over the inner cavity 20 at one end of the casing 12, while the second cover assembly 18 defines a substantially planar second gas chamber 24 therein extending over the inner cavity 20 at the axially opposite end of the casing 12.

Figure 12:
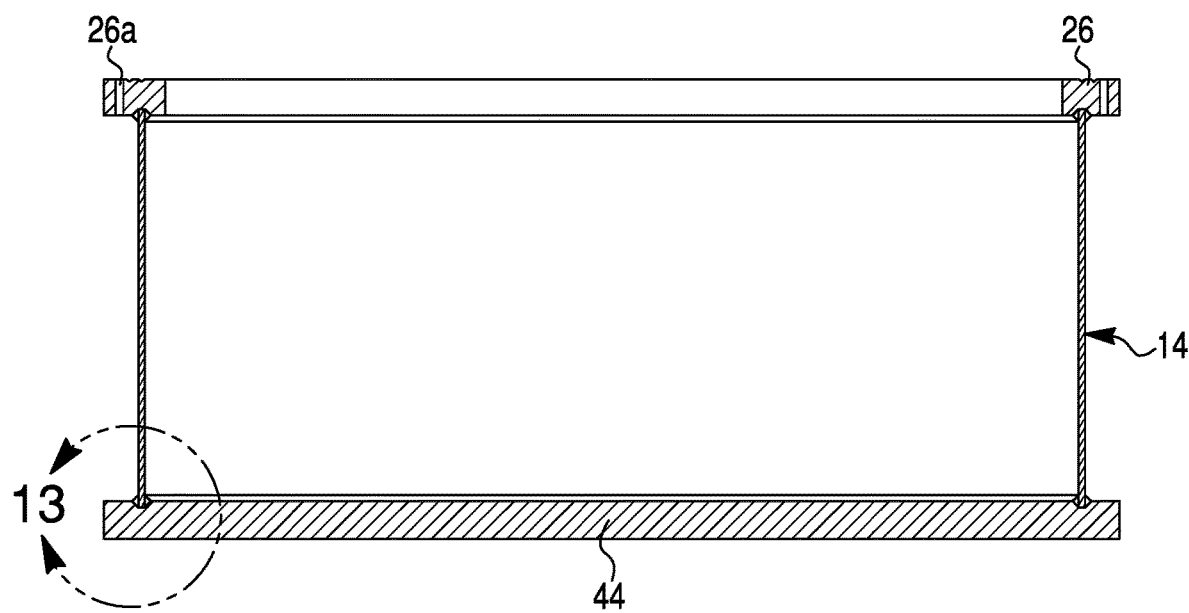
FIG. 12 is a fragmented cross-sectional view of the capsulation satellite module without the first cover plate and the first and second fan plate assemblies taken along the line 12-12 in FIG. 11.

The first cover assembly 16 includes a ring 26, a substantially planar (or flat) first (or top) cover plate 28 and a first fan plate assembly $30_1$ mounted to the first (or top) cover plate 28 inside the casing 12. The ring 26 is non-moveably (i.e., fixedly) connected to a first axial end $15_1$ of the sidewall 14 by appropriate means, such as by welding 27, as best shown in FIG. 12. As further illustrated in FIGS. 8-12, the first cover plate 28 is removably connected to the ring 26 by appropriate means known in the art, such as bolts, screws and other mechanical fasteners, with one or more sealing components disposed between the ring 26 and the first cover plate 28, such O-rings 31, best shown in FIG. 10. According the exemplary embodiment of the present invention, the ring 26 and the first cover plate 28 are made of aluminum alloy.

Figure 13:
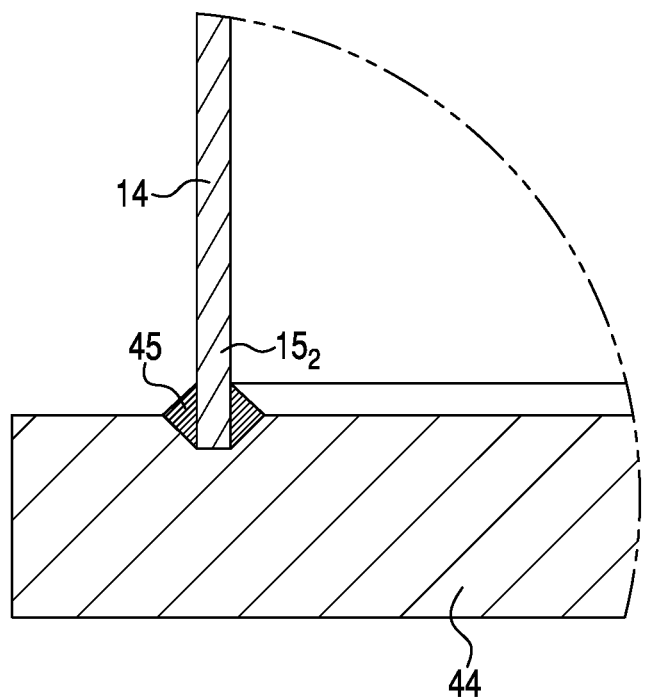
FIG. 13 is an enlarged view of a fragment of the casing of the capsulation satellite module shown in the circle "13" of FIG. 12.
Figure 14:
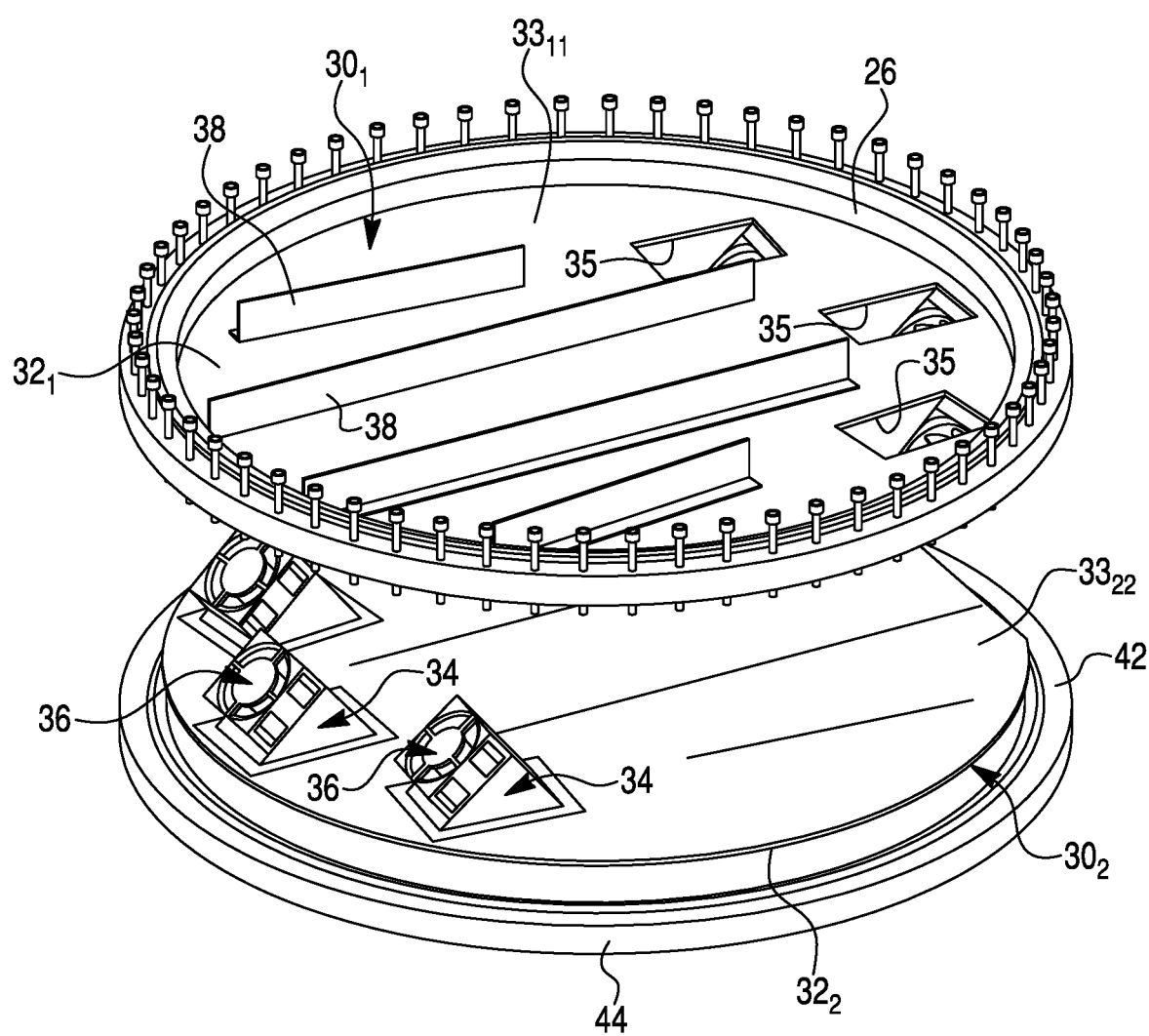
FIG. 14 is a partial perspective view with portions broken away of the first and second cover assemblies in accordance with the exemplary embodiment of the present invention.

According to the exemplary embodiment of the present invention, the first cover plate 28 is connected to the ring 26 by threaded fasteners, such as bolts 29, as best shown in FIG. 8-12, threadedly engaging threaded holes 26a in the ring 26, as best shown in FIGS. 13 and 14. Thus, the first cover plate 28 is removable from the sidewall 14 and the ring 26.

Figure 6:
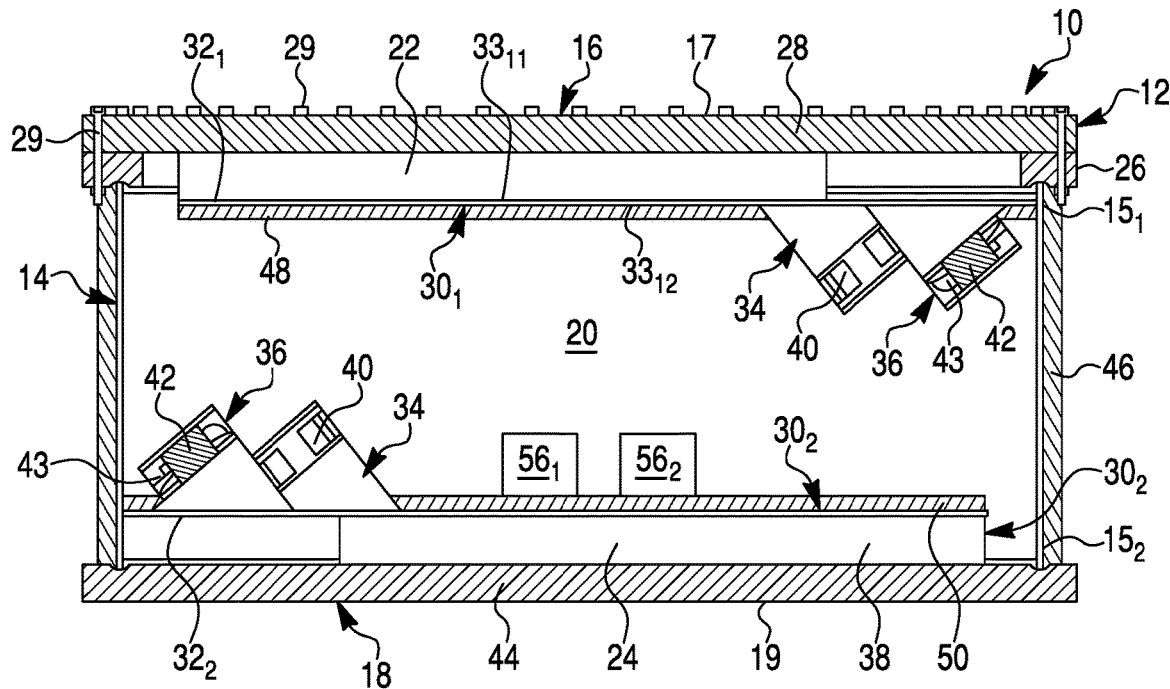
FIG. 6 is a fragmented cross-sectional view of the capsulation satellite module in accordance with the exemplary embodiment of the present invention taken along the line 6-6 in FIG. 5 also showing the first cover assembly and a second cover assembly.
Figure 8:
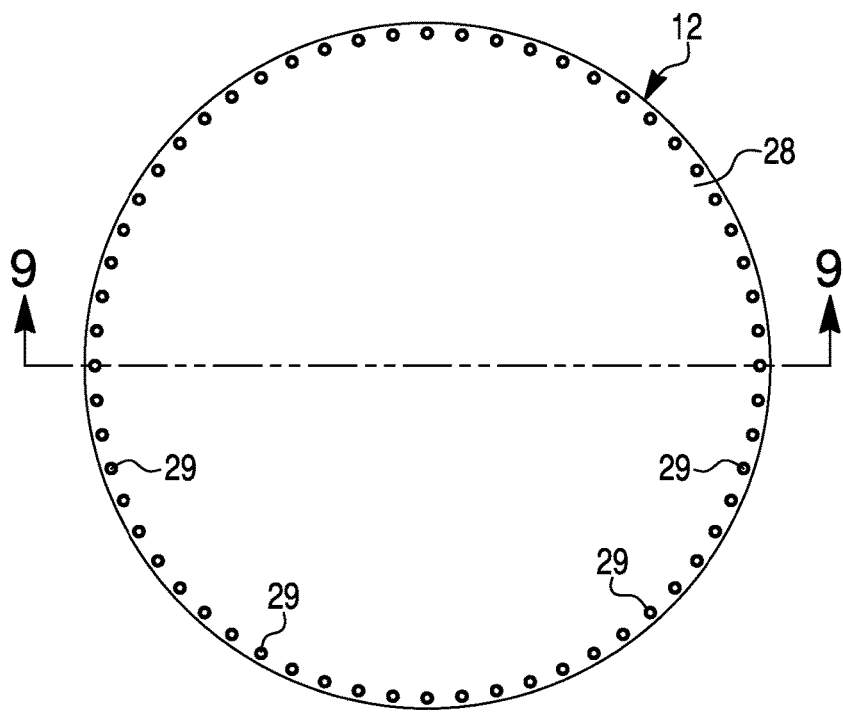
FIG. 8 is a top view of the casing of the capsulation satellite module in accordance with the exemplary embodiment of the present invention.
Figure 9:
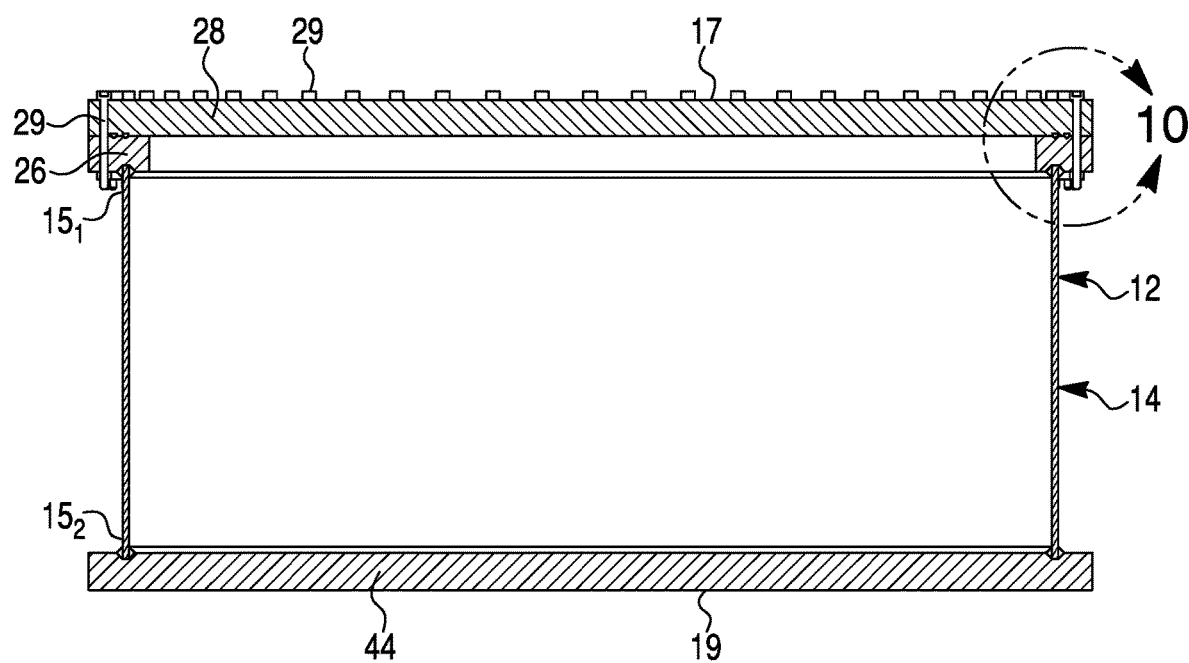
FIG. 9 is a fragmented cross-sectional view of the capsulation satellite module without first and second fan plate assemblies taken along the line 9-9 in FIG. 8.
Figure 10:
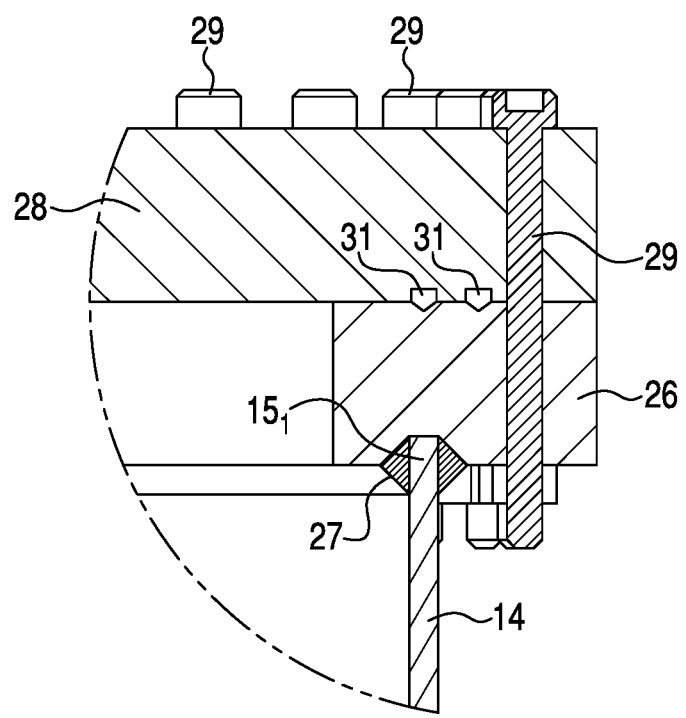
FIG. 10 is an enlarged view of a fragment of the casing of the capsulation satellite module shown in the circle "10" of FIG. 9.
Figure 11:
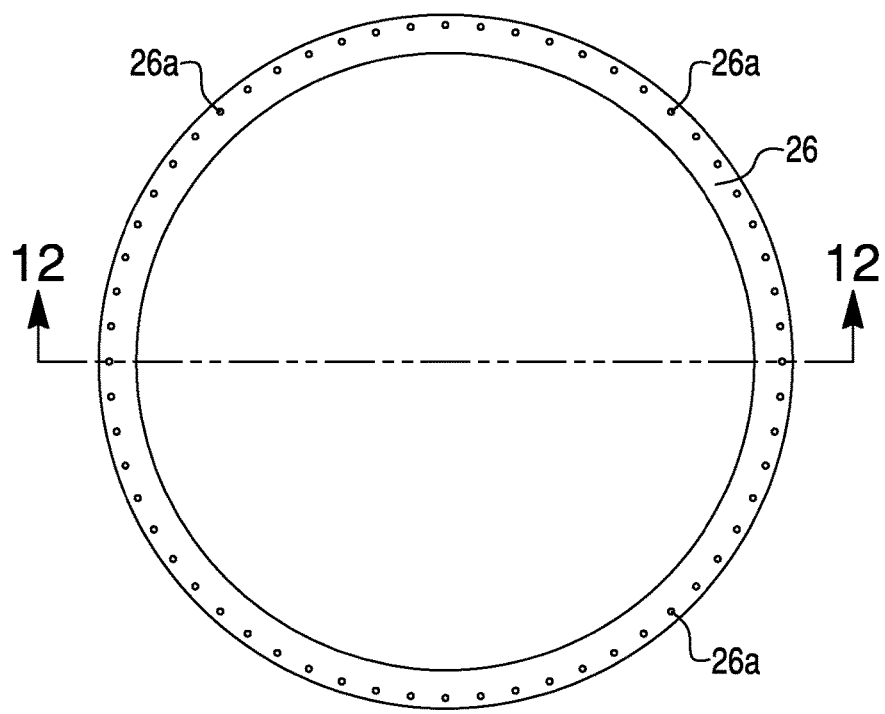
FIG. 11 is a top view of the casing of the capsulation satellite module in accordance with the exemplary embodiment of the present invention without a first cover plate and the first and second fan plate assemblies.

As best shown in FIG. 6, the first fan plate assembly $30_1$ includes a first substantially planar (or flat) support plate $32_1$, one or more fan ducts 34 each extending inwardly and angularly from the first support plate $32_1$ into the inner cavity 20 of the casing 12, and a fan unit 36 mounted in and disposed within each of the fan ducts 34. The planar first support plate $32_1$ is axially spaced from and extends substantially parallel to the first cover plate 28 of the first cover assembly 16, as best shown in FIGS. 6, 8 and 9. The first gas chamber 22 is defined between the first cover plate 28 and the first support plate $32_1$ of the first fan plate assembly $30_1$. The planar first support plate $32_1$ is secured to the first cover plate 28 by appropriate means, such as threaded fasteners.

Figure 5:
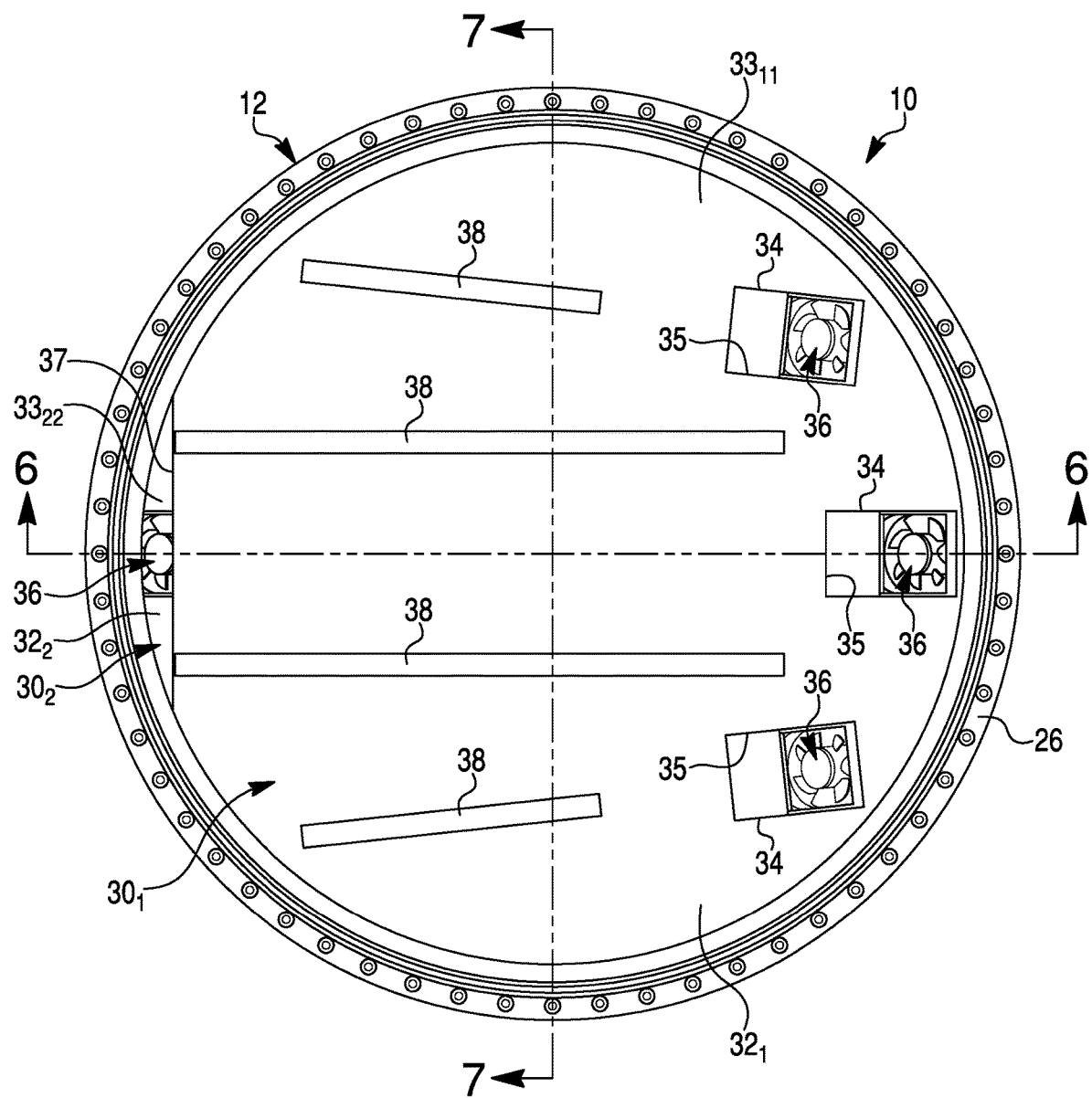
FIG. 5 is a top view with portions broken away of the casing of the capsulation satellite module in accordance with the exemplary embodiment of the present invention without a first cover assembly.
Figure 16:
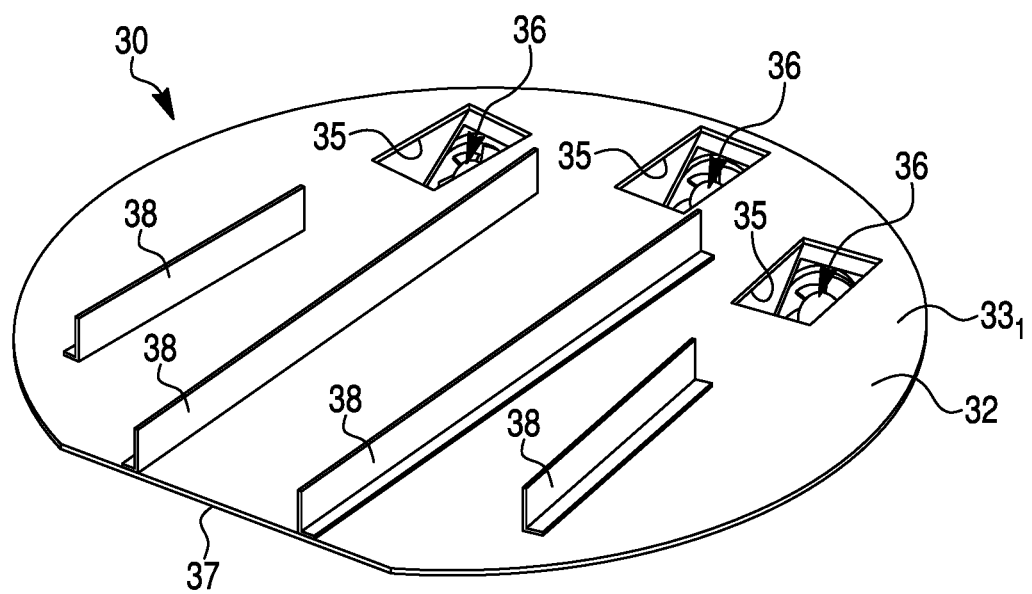
FIG. 16 is a perspective view of the cover assembly from the top in accordance with the exemplary embodiment of the present invention.

The first support plate $32_1$ has an outer surface $33_{11}$ facing the first cover plate 28, and an inner surface $33_{12}$ facing the inner cavity 20 of the casing 12, and the second cover assembly 18. The first fan plate assembly $30_1$ further includes one or more cooling fins 38, as best shown in FIGS. 5, 14 and 16, attached to the outer surface $33_{11}$ of the first support plate $32_1$ and disposed in the first gas chamber 22 of the first cover assembly 16 so as to extend from the first support plate $32_1$ to the first cover plate 28. The cooling fins 38 are non-moveably attached to the outer surface $33_1$ of the first support plate $32_1$ by appropriate means, such as by welding or fasteners, such as rivets.

The first support plate $32_1$ further includes one or more through openings 35 each in fluid communication with one of the fan ducts 34. Each of the fan ducts 34 has an open proximal end fixed to the inner surface $33_2$ of the first support plate $32_1$, and an open free distal end having one or more apertures 40 open to the inner cavity 20 of the casing 12. The open proximal end of each fan duct 34 is fixed to the first support plate 32 and in fluid communication with an associated one of the openings 35. Accordingly, the first gas chamber 22 is fluidly connected to the sealed inner cavity 20 of the casing 12 through the fan ducts 34.

The fan unit 36 includes an electric motor 42 and an axial flow fan 43 driven by the electric motor 42 and surrounded by the fan duct 34. In other words, both the electric motor 42 and the axial flow fan 43 are disposed within a fan duct 34. As best shown in FIG. 6 the axial flow fan 43 is disposed adjacent to the apertures 40 through the corresponding fan duct 34. Power is supplied to the electric motor 42 by at least one rechargeable battery 52 operably connected to the electric motor 42. The fan unit 36 is configured to actively circulate air (or any other gas within the sealed inner cavity 20) between the inner cavity 20 and the first gas chambers 22. Specifically, the fan unit 36 of the first fan plate assembly $30_1$ is configured to draw air from the inner cavity 20 into the first gas chambers 22.

Figure 7:
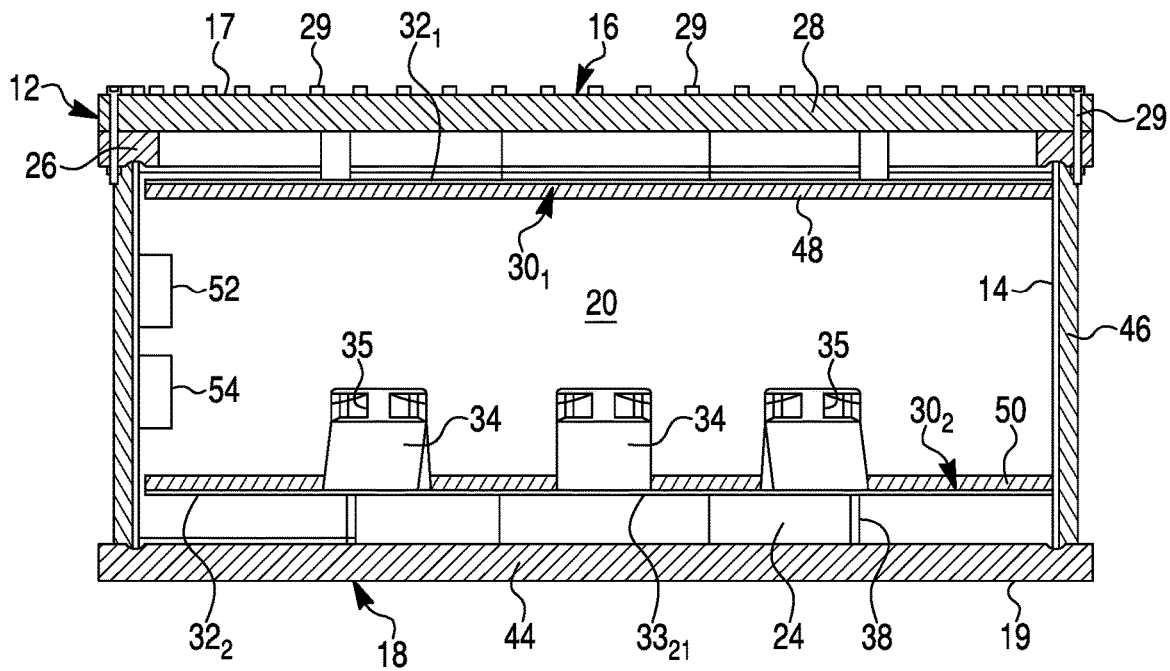
FIG. 7 is a fragmented cross-sectional view of the capsulation satellite module in accordance with the exemplary embodiment of the present invention taken along the line 7-7 in FIG. 5 also showing the first cover assembly and the second cover assembly.

The rechargeable battery 52 is mounted within the inner cavity 20 of the casing 12. Preferably, as shown in FIG. 7 the rechargeable battery 52 is secured to the sidewall 14 of the casing 12. A conventional electric motor control unit 54 is configured to control the operation of the electric motor 42. The motor control unit 54 is also mounted within the inner cavity 20 of the casing 12, preferably, to the sidewall 14 of the casing 12, as shown in FIG. 7.

The second cover assembly 18 includes a substantially planar (or flat) second (or bottom) cover plate 44 and a second fan plate assembly $30_2$ mounted to the second (or bottom) cover plate 44 inside the casing 12. The second cover plate 44 is non-moveably (i.e., fixedly) connected to a second axial end $15_2$ of the sidewall 14 axially opposite the first cover plate 28 by appropriate means, such as by welding 45, as best shown in FIG. 13. According to the exemplary embodiment of the present invention, the second cover plate 44 is made of an aircraft grade aluminum alloy.

The second fan plate assembly $30_2$ is substantially similar to the first fan plate assembly $30_1$ and includes a substantially planar (or flat) second support plate $32_2$, one or more fan ducts 34 each extending inwardly and angularly from the second support plate $32_2$ into the inner cavity 20 of the casing 12, and a fan unit 36 mounted in and disposed within each of the fan ducts 34. The fan unit 36 of the second fan plate assembly $30_2$ is configured to actively circulate air (or any other gas within the sealed inner cavity 20) between the inner cavity 20 and the second gas chamber 24. Specifically, the fan unit 36 of the second fan plate assembly $30_2$ is configured to draw the air from the inner cavity 20 into the second gas chambers 24.

The planar second support plate $32_2$ is axially spaced from and extends substantially parallel to the second cover plate 44 of the second cover assembly 18, as best shown in FIGS. 6 and 7. The second support plate $32_2$ has an outer surface $33_{21}$ facing the second cover plate 44, and an inner surface $33_{22}$ facing the inner cavity 20 of the casing 12, and the first cover assembly 16. The second fan plate assembly $30_2$ further includes one or more cooling fins 38 attached to the outer surface $33_{21}$ of the second support plate $32_2$ and disposed in the second gas chamber 24 of the second cover assembly 18 so as to extend from the second support plate $32_2$ to the second cover plate 44. Moreover, the second gas chamber 24 is fluidly connected to the sealed inner cavity 20 of the casing 12 through the fan ducts 34. The planar second support plate $32_2$ is secured to the second cover plate 44 by appropriate means, such as threaded fasteners.

Therefore, each of the first and second gas chambers 22 and 24 is fluidly connected to the sealed cavity 20 through the fan ducts 34 and to each other through the sealed cavity 20.

The first and second fan plate assemblies $30_1$ and $30_2$ are substantially structurally identical in the exemplary embodiment. They each include a substantially planar (or flat) support plate $32_1$, $32_2$, one or more fan ducts 34 each extending inwardly and angularly from the associated support plate $32_1$, $32_2$ into the inner cavity 20 of the casing 12, and the fan unit 36 mounted in and disposed within each of the fan ducts 34. In view of these similarities, and in the interest of simplicity, the following discussion will sometimes use a reference numeral without a letter to designate an entire group of substantially identical structures. For example, the reference numeral 30 will be sometimes used when generically referring to the first and second fan plate assemblies $30_1$ and $30_2$ rather than reciting all two reference numerals. Similarly, the reference numeral 32 will be sometimes used when generically referring to the first and second support plates $32_1$ and $32_2$, the reference numeral $33_1$ will be sometimes used when generically referring to the outer surface of the support plate 32, and the reference numeral $33_2$ will be sometimes used when generically referring to the inner surface of the support plate 32.

The first cover plate 28 of the first cover assembly 16 has a circular first outer peripheral surface 17 facing away from the second cover assembly 18, while the second cover plate 44 of the second cover assembly 18 has a circular second outer peripheral surface 19 facing away from the first cover assembly 16, as best shown in FIG. 9.

Figure 15:
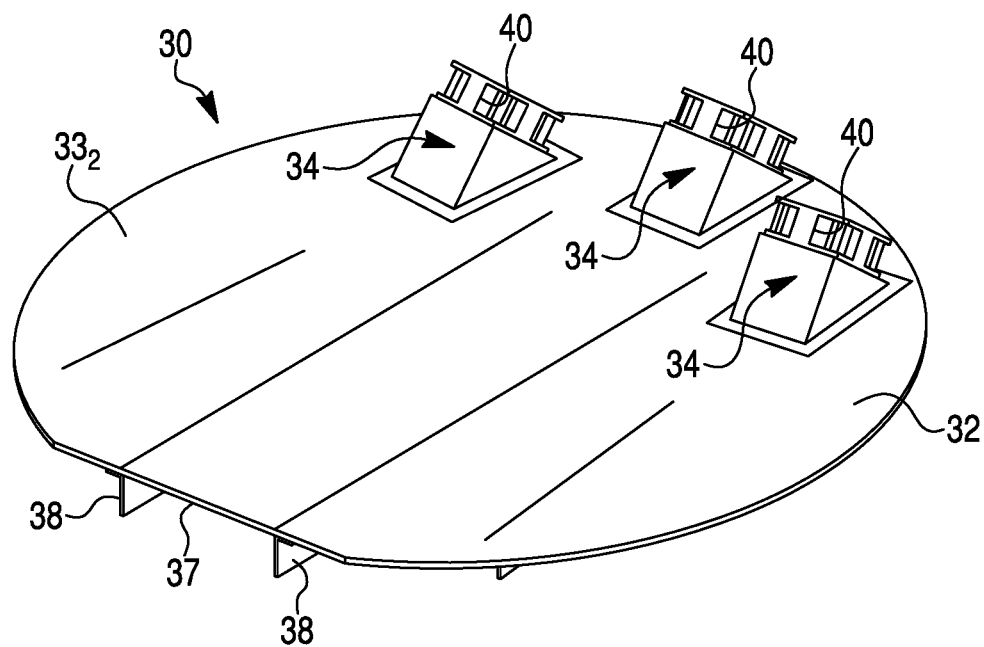
FIG. 15 is a perspective view of the cover assembly from the bottom in accordance with the exemplary embodiment of the present invention.

According to the exemplary embodiment of the present invention, the planar support plate 32 of the fan plate assembly 30 is substantially circular but with a circular segment "cut off" from the rest of the circle by a chord 37, as best shown in FIGS. 5, 15 and 16. The term "a circular segment" is defined in the art as a region of two-dimensional space that is bounded by an arc (of less than 180°) of a circle and by the chord connecting the endpoints of the arc. Thus, the planar support plate 32 of the fan plate assembly 30 without a circular segment defined by the chord 37 defines an opening between the sidewall 14 and the chord 37 of the planar support plate 32, which provides further fluid communication between the first and second gas chambers 22, 24 and the inner cavity 20 of the casing 12.

Therefore, according the exemplary embodiment of the present invention, the air from the inner cavity 20 is drawn into the first gas chambers 22 by the fan unit 36 of the first fan plate assembly $30_1$, and expelled from the first gas chambers 22 through an opening between the sidewall 14 and the chord 37 of the circular first support plate $32_1$ of the first fan plate assembly $30_1$. Similarly, the air from the inner cavity 20 is drawn into the second gas chambers 24 by the fan unit 36 of the second fan plate assembly $30_2$, and expelled from the second gas chambers 24 through an opening between the sidewall 14 and the chord 37 of the circular second support plate $32_2$ of the second fan plate assembly $30_2$.

The capsulation satellite module 10 further comprises a continuous sidewall insulation member 46 (thermal blanket) secured to a cylindrical outer surface of the sidewall 14, as best shown in FIGS. 6 and 7. According to the exemplary embodiment of the present invention, the sidewall insulation member 46 is a conventional multi-layer insulation, or MLI. It is known in the art that MLI is thermal insulation composed of multiple layers of thin sheets and is typically used on spacecraft and satellites. It is one of the main pieces of the spacecraft thermal design, primarily intended to reduce heat loss by thermal radiation. In its basic form, it does not appreciably insulate against other thermal losses such as heat conduction or convection. It is therefore commonly used on satellites and other applications in vacuum where conduction and convection are much less significant and radiation dominates. MLI gives many satellites and other space probes the appearance of being covered with gold foil.

The capsulation satellite module 10 further comprises a first insulation member 48 secured to the inner surface $33_{12}$ of the first support plate $32_1$ and facing the inner cavity 20 of the casing 12. Moreover, the capsulation satellite module 10 comprises a second insulation member 50 secured to the inner surface $33_{22}$ of the second support plate $32_2$ and facing the inner cavity 20 of the casing 12. Insulation members 48 and 50 thermally insulate module 10 in order to minimize ambient/internal temperature variations.

Figure 17:
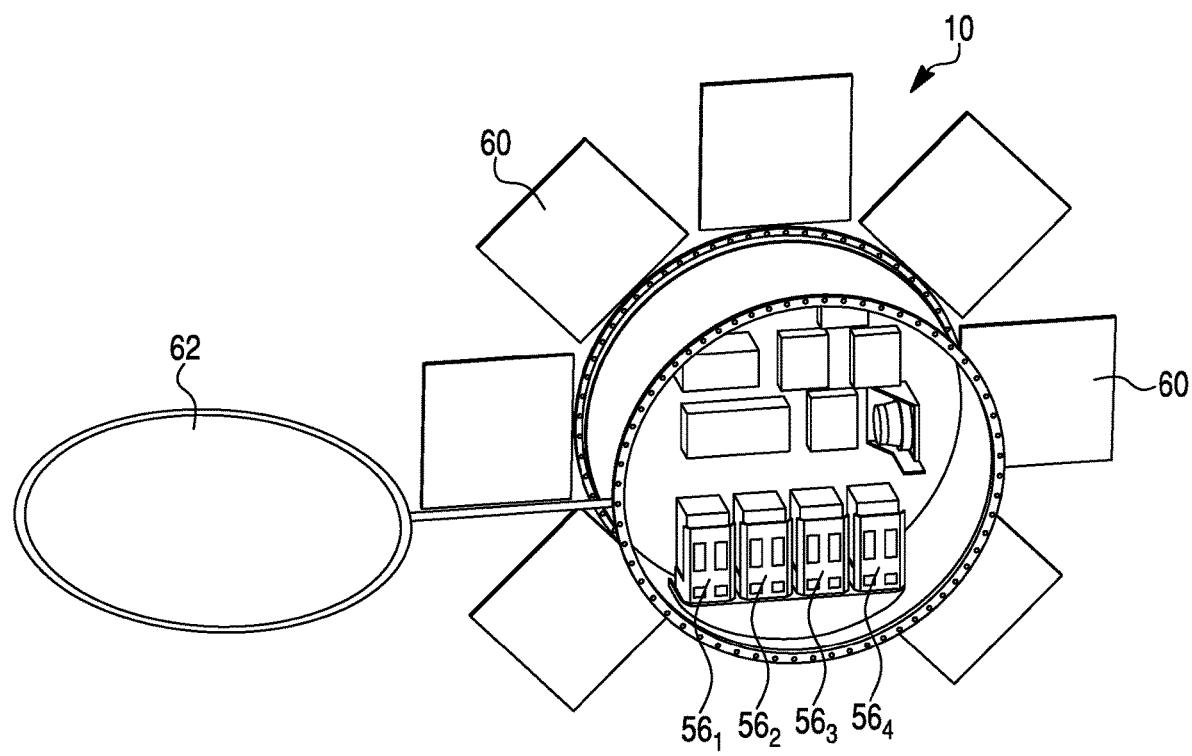
FIG. 17 is a perspective view of capsulation satellite module in accordance with the exemplary embodiment of the present invention in an orbit with deployed solar cell arrays and an antenna.

The capsulation satellite module 10 further comprises at least one, preferably two or more scientific instruments and/or other pieces of equipment, for example, $56_1$ and $56_2$ best shown in FIGS. 6, and $56_1$-$56_4$ best shown in FIG. 17, for outer space exploration, such as a high-resolution camera, telescope, magnetometer, spectrometer, etc., disposed within the hermetically sealed inner cavity 20 of the casing 12. Each of the modules 10, according to the exemplary embodiment, measures about 40" in diameter, is about 18" tall, and is capable of carrying about 660 pounds of payload into orbit.

The capsulation satellite module 10 further comprises at least one, preferably more, deployable solar cell arrays 60 mounted to the casing 12 outside the inner cavity 20, as best shown in FIG. 17. In other words, the solar cell arrays 60 are folded during transport into orbit and are then deployed in space by conventional mechanisms. Conventionally, the solar cell arrays 60 are the primary electric power source for the capsulation satellite module 10, and collect solar radiation and convert it into the electrical power necessary to charge the rechargeable battery 52 and operate the electric motor 42 of the fan unit 36 and scientific instruments $56_1$ and $56_2$. Each of the solar cell arrays 60 typically comprises one or more solar panels electrically connected to each other and to the capsulation satellite module 10. Each solar panel in the solar cell array 60 typically comprises numerous individual solar (photovoltaic) cells, which are usually laid out in rows and connected together electrically at their adjacent edges. The photovoltaic cells form a two-dimensional array and are frequently mounted on a rigid honeycomb composite solar panel.

The capsulation satellite module 10 further comprises at least one directional or omni-directional antenna 62 mounted to the casing 12 outside the inner cavity 20, as best shown in FIG. 17.

A method of operation of the capsulation satellite module 10 is as follows. The capsulation satellite module 10 is deployed in an orbit in outer space. The orbiting capsulation satellite module 10 is exposed to extreme temperature variations as the capsulation satellite module 10 alternatingly faces the Sun and is hidden from the Sun as it rotates about the Earth. When hidden from the Sun, temperatures of about −100° F. will be present, however temperatures of more than 160° F. will be present when the capsulation satellite module 10 faces the Sun. Moreover, there is no convection in outer space. Accordingly, the orbiting capsulation satellite module 10 is oriented in outer space so that one of the first outer peripheral surface 17 of the first cover plate 28 and the second outer peripheral surface 19 of the second cover assembly 18 faces the Sun, while another of the first outer peripheral surface 17 of the first cover plate 28 and the second outer peripheral surface 19 of the second cover assembly 18 faces away from the Sun. In other words, one of the first and second gas chambers 22, 24 faces the Sun and defines a hot well, while another of the first and second gas chambers 22, 24 faces away from the Sun and defines a cold well. The temperature extremes can damage electrical components located within the capsulation module 10, particularly as the temperature extremes may be cyclically applied to the electrical components.

The fan units 36 of at least one but preferably of both of the first and second fan plate assemblies 30 are activated to create air circulation between the inner cavity 20 and the first and second gas chambers 22, 24, i.e., between the hot and cold wells, thus cooling or heating the inner cavity 20 of the casing 12 in order to maintain a substantially uniform temperature, such as a terrestrial room temperature within the casing 12. By adjusting the air flow from the hot and cold wells (by controlling the fan units 36 of at least one of the first and second fan plate assemblies 30) a constant temperature within the inner cavity 20 of the casing 12 can be maintained. When the capsulation satellite module 10 flies through an eclipse of the orbit, the air flow through the cold well is halted, and the insulated inner cavity 20 stays warm without supplying air flow from the hot well. In other words, because there is no convection in outer space, heat is removed from the inner cavity 20 of the casing 12 of the capsulation satellite module 10 by conductive heat transfer.

Accordingly, the capsulation satellite module 10 of the present invention provides an active closed loop temperature control system, which is configured to maintain a substantially terrestrial atmospheric pressure and a substantially terrestrial room temperature within the casing 12 in the outer space.

As a result, the capsulation satellite module 10 of the present invention provides a significant power savings for a small spacecraft. Moreover, due to the active temperature control system of the capsulation satellite module 10, the scientific instruments and/or other pieces of equipment within the inner cavity 20 of the casing 12 are exposed to minimal thermal cycling, which is a major source of stress and cause of on-orbit failure of scientific instruments and other pieces of equipment during outer space exploration. Thus, the capsulation satellite module 10 of the present invention provides a benign almost constant on-orbit thermal environment significantly enhancing electronic longevity.

Therefore, the present invention provides a novel pressurized, thermally controlled capsulation satellite module designed as a stand-alone module or a stacked system of individual modules depending on payload needs. The capsulation satellite module of the present invention is relatively simple, inexpensive and provides a significant power savings.

The foregoing description of the exemplary embodiment(s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A capsulation satellite module for carrying a payload on an orbit in outer space, the capsulation satellite module comprising a casing defining a hermetically sealed inner cavity therewithin, the casing including:
   a continuous sidewall; and
   first and second cover assemblies mounted to axially opposite sides of the sidewall so as to delimit the hermetically sealed inner cavity within the casing;
   the first cover assembly defining a first gas chamber therein extending over the inner cavity of the casing; and
   the second cover assembly defining a second gas chamber therein extending over the inner cavity of the casing;
   each of the first gas chamber and the second gas chamber fluidly connected to the sealed inner cavity and to each other through the sealed inner cavity to maintain predetermined pressure and temperature within the cavity.

2. The capsulation satellite module as defined in claim 1, further comprising at least one piece of equipment disposed within the hermetically sealed inner cavity.

3. The capsulation satellite module as defined in claim 1, wherein the casing further includes a sidewall insulation member secured to an outer surface of the sidewall.

4. The capsulation satellite module as defined in claim 1, wherein the casing further includes a first insulation member secured to the first cover assembly so as to face the inner cavity of the casing.

5. The capsulation satellite module as defined in claim 4, wherein the casing further includes a second insulation member secured to the second cover assembly so as to face the inner cavity of the casing.

6. The capsulation satellite module as defined in claim 1, wherein the first cover assembly includes a first cover plate and a first fan plate assembly secured to the first cover plate inside the casing.

7. The capsulation satellite module as defined in claim 6, wherein the first cover plate is removably connected to the casing.

8. The capsulation satellite module as defined in claim 6, wherein the first fan plate assembly includes a first support plate, at least one fan duct fluidly connecting the first gas chamber to the sealed inner cavity and a fan unit disposed in the at least one fan duct, wherein the first support plate is axially spaced from the first cover plate, and wherein the first gas chamber is defined between the first cover plate and the first support plate of the first fan plate assembly.

9. The capsulation satellite module as defined in claim 8, wherein the first fan plate assembly further includes at least one cooling fin attached to the first support plate and disposed in the first gas chamber of the first cover assembly so as to extend between the first support plate and the first cover plate.

10. The capsulation satellite module as defined in claim 8, wherein the fan unit includes an electric motor and an axial flow fan driven by the electric motor.

11. The capsulation satellite module as defined in claim 10, further comprising at least one rechargeable battery mounted within the inner cavity of the casing and operably connected to the electric motor and an electric motor control unit for controlling the operation of the electric motor.

12. The capsulation satellite module as defined in claim 11, wherein the second cover assembly includes a second cover plate and a second fan plate assembly secured to the second cover plate inside the casing.

13. The capsulation satellite module as defined in claim 12, wherein the second cover plate is non-removably secured to the casing.

14. The capsulation satellite module as defined in claim 12, wherein the second fan plate assembly includes a second support plate, at least one fan duct fluidly connecting the second gas chamber to the sealed inner cavity and a fan unit disposed in the at least one fan duct, wherein the second support plate is axially spaced from the second cover plate, and wherein the second gas chamber is defined between the second cover plate and the second support plate of the second fan plate assembly.

15. The capsulation satellite module as defined in claim 14, wherein the second fan plate assembly further includes at least one cooling fin attached to the second support plate and disposed in the second gas chamber of the second cover assembly so as to extend between the second support plate and the second cover plate.

16. The capsulation satellite module as defined in claim 14, wherein the fan unit of the second fan plate assembly includes an electric motor and an axial flow fan driven by the electric motor, and wherein the electric motor of the second fan plate assembly is operably connected to the at least one rechargeable battery and the electric motor control unit for controlling the operation of the electric motor of the second fan plate assembly.

17. The capsulation satellite module as defined in claim 14, wherein each of the first and second support plates is substantially planar and circular without a circular segment defined by a chord.

18. A method for operating of a capsulation satellite module comprising a casing defining a hermetically sealed inner cavity therewithin and including a continuous sidewall, and first and second cover assemblies mounted to axially opposite sides of the sidewall so as to delimit the hermetically sealed inner cavity within the casing and to maintain a predetermined pressure and temperature within the cavity, the first cover assembly defining a substantially planar first gas chamber therein extending over the inner cavity of the casing, the second cover assembly defining a substantially planar second gas chamber therein extending over the inner cavity of the casing, each of the first gas chamber and the second gas chamber fluidly connected to the sealed inner cavity and to each other through the sealed inner cavity, the method including the steps of:

deploying the capsulation satellite module in an orbit in outer space; and orienting the capsulation satellite module so that an outer peripheral surface of one of the first and second cover assemblies faces the Sun, and an outer peripheral surface of another of the first and the second cover assembly faces away from the Sun.

19. The method as defined in claim 18, wherein the first cover assembly includes a first cover plate and a first fan plate assembly mounted to the first cover plate inside the casing, and wherein the first fan plate assembly includes a first support plate, at least one fan duct fluidly connecting the first gas chamber to the sealed inner cavity and a fan unit disposed in the at least one fan duct, wherein the first support plate is axially spaced from the first cover plate, and wherein the first gas chamber is defined between the first cover plate and the first support plate of the first fan plate assembly, the method further including the step of activating the fan unit of the first fan plate assembly so as to create air circulation between the inner cavity and the first and second gas chambers.

20. The method as defined in claim 19, wherein the second cover assembly includes a second cover plate and a second fan plate assembly mounted to the second cover plate inside the casing, and wherein the second fan plate assembly includes a second support plate, at least one fan duct fluidly connecting the second gas chamber to the sealed inner cavity and a fan unit disposed in the at least one fan duct, wherein the second support plate is axially spaced from the second cover plate, and wherein the second gas chamber is defined between the second cover plate and the second support plate of the second fan plate assembly, the method further including the step of activating the fan unit of the second fan plate assembly so as to create air circulation between the inner cavity and the first and second gas chambers.

* * * * *